US008559947B2

(12) United States Patent
Nath et al.

(10) Patent No.: US 8,559,947 B2
(45) Date of Patent: Oct. 15, 2013

(54) SYSTEM AND METHOD TO ENABLE SUBSCRIBER SELF-ACTIVATION OF WIRELESS DATA TERMINALS

(75) Inventors: Badri Nath, Edison, NJ (US); Rakesh Kushwaha, Marlboro, NJ (US)

(73) Assignee: Mformation Software Technologies LLC, Edison, NJ (US)

( * ) Notice: Subject to any disclaimer, the term of this patent is extended or adjusted under 35 U.S.C. 154(b) by 1303 days.

(21) Appl. No.: 11/798,243

(22) Filed: May 11, 2007

(65) Prior Publication Data

US 2008/0064367 A1 Mar. 13, 2008

Related U.S. Application Data

(60) Provisional application No. 60/844,109, filed on Sep. 13, 2006.

(51) Int. Cl.
| H04M 1/66 | (2006.01) |
| H04W 4/00 | (2009.01) |
| G06F 7/04 | (2006.01) |
| H04K 1/00 | (2006.01) |

(52) U.S. Cl.
USPC ............ 455/435.1; 455/410; 455/411; 726/2; 726/5; 380/247; 380/249

(58) Field of Classification Search
USPC ............... 455/420, 410, 411, 435.1; 726/2–5; 380/247–249
See application file for complete search history.

(56) References Cited

U.S. PATENT DOCUMENTS

| 5,999,806 | A | * | 12/1999 | Kaplan et al. ................. 455/411 |
| 6,144,849 | A | | 11/2000 | Nodoushani et al. |
| 6,381,454 | B1 | | 4/2002 | Tiedemann et al. |
| 6,438,114 | B1 | | 8/2002 | Womack |
| 6,466,779 | B1 | | 10/2002 | Moles et al. |
| 6,529,729 | B1 | | 3/2003 | Nodoushani et al. |
| 6,549,770 | B1 | | 4/2003 | Marran |

(Continued)

FOREIGN PATENT DOCUMENTS

| EP | 1662829 A1 | 5/2006 |
| JP | 2004518356 | 6/2004 |

(Continued)

OTHER PUBLICATIONS

Delaney, Brian William; "Reduced Energy Consumption and Improved Accuracy for Distributed Speech Recognition in Wireless Environments" Ph.D. Thesis, Georgia Tech Electrical and Computer Engineering Dept. Published Sep. 2004, www.gtel.gatech.edu/bitstream/123456789.

(Continued)

*Primary Examiner* — Wesley Kim
(74) *Attorney, Agent, or Firm* — Brosemer, Kolefas & Associates, LLC

(57) ABSTRACT

The present invention relates to a system and method to enable subscriber self-activation and configuration of wireless data terminals by means of an activate button provided through the User Interface (UI). This allows for operations to be performed on the device by self-care. Any wireless device, in order to access the network needs credentials. This invention generates temporary credentials to present to the network for service activation. Once access is granted to the network, the device can be activated and configured for using the resources of the network.

23 Claims, 5 Drawing Sheets

(56) References Cited

U.S. PATENT DOCUMENTS

| | | |
|---|---|---|
| 6,577,614 B1 | 6/2003 | Cook et al. |
| 6,622,017 B1 | 9/2003 | Hoffman |
| 6,625,451 B1 | 9/2003 | La Medica, Jr. et al. |
| 6,725,056 B1 | 4/2004 | Moles et al. |
| 6,813,264 B2 | 11/2004 | Vassilovski |
| 6,845,092 B2 | 1/2005 | Vassilovski et al. |
| 6,980,556 B2 | 12/2005 | Vimpari |
| 7,020,440 B2 | 3/2006 | Watanabe |
| 7,085,253 B2 | 8/2006 | Yang |
| 7,305,090 B1 * | 12/2007 | Hayes et al. ............... 380/249 |
| 2002/0073203 A1 | 6/2002 | Gilleland |
| 2003/0014488 A1 | 1/2003 | Dalal |
| 2003/0101246 A1 | 5/2003 | Lahti |
| 2003/0153339 A1 | 8/2003 | Crockett |
| 2003/0166398 A1 | 9/2003 | Netanel |
| 2004/0024879 A1 | 2/2004 | Dingman |
| 2004/0032843 A1 | 2/2004 | Schaefer |
| 2004/0242209 A1 | 12/2004 | Kruis |
| 2005/0055687 A1 | 3/2005 | Mayer |
| 2005/0181793 A1 * | 8/2005 | Netanel ................ 455/435.2 |
| 2005/0254510 A1 | 11/2005 | Oja |
| 2006/0023651 A1 | 2/2006 | Tsuchiuchi et al. |
| 2006/0190575 A1 | 8/2006 | Harvey et al. |
| 2007/0025070 A1 * | 2/2007 | Jiang et al. ................ 361/680 |
| 2007/0136795 A1 * | 6/2007 | Youn ............................ 726/5 |
| 2009/0024848 A1 * | 1/2009 | Takasugi et al. ............ 713/169 |
| 2009/0025070 A1 * | 1/2009 | Netanel et al. ................ 726/5 |

FOREIGN PATENT DOCUMENTS

| | | |
|---|---|---|
| JP | 200642087 | 2/2006 |
| WO | 02058361 A2 | 7/2002 |
| WO | 2005109947 A1 | 11/2005 |

OTHER PUBLICATIONS

Official Communication dated Apr. 8, 2008 which accompanies an International Search Report and a Written Opinion of the International Searching Authority, in PCT/US 07/19818.

Notification of Reason for Rejection Japanese Office Action dated Apr. 23, 2012 received in corresponding Application No. 2009-528271.

Notification of Transmittal of International Search Report and the Written Opinion of the International Searching Authority dated Jun. 27, 2008 for PCT Appln. No. PCT/US200861305.

Non-Final Office Action dated Nov. 10, 2009 received in U.S. Appl. No. 11/786,000.

Final Office Action dated Jun. 29, 2010 received in U.S. Appl. No. 11/786,000.

Supplementary European Search Report dated Feb. 7, 2012 received in Application No. 07838093.8-2413/2060106.

Extended European Search Report dated Jan. 19, 2012 received in Application No. 07838093.8-2413/2060106.

Non-Final Office Action dated Sep. 6, 2012 received in U.S. Appl. No. 11/786,000.

Response filed Jan. 7, 2013 to non-final Office Action of Sep. 6, 2012 in U.S. Appl. No. 11/786,000.

Communication pursuant to Article 94(3) EPC in European Patent Application No. 07838093.8, Sep. 17, 2012.

Response filed Jul. 3, 2012 to Communication pursuant to Rules 70(2) and 70a(2) EPC of Feb. 7, 2012 in European Patent Application No. 07838093.8.

* cited by examiner

SYSTEM
100

SYSTEM AND METHOD TO ENABLE SUBSCRIBER SELF-ACTIVATION OF WIRELESS DATA TERMINALS

CROSS-REFERENCE TO RELATED APPLICATIONS

This application claims the benefit of provisional application 60/844,109, filed Sep. 13, 2006, the entirety of which is incorporated herein by reference.

FIELD OF THE INVENTION

The present invention relates to a system and method for providing over the air (OTA) subscriber activation of a wireless device. Self-activation, or provisioning, of wireless devices requires allowing a wireless device to access a network in order to subscribe to the network, establishing a connection to a management server to download credentials required for subscription, and provisioning and activating the wireless device consistent with user-defined parameters.

BACKGROUND OF THE INVENTION

Wireless devices are designed to connect to a core network, either directly through a base station or through another wireless device. Many networks are controlled by provider systems that require activation and registration of a device on the network before the device is allowed full network access.

Currently, systems that allow the over-the-air (OTA) activation of unregistered devices designate special phone numbers to allow users wishing to activate devices to call a wireless customer care center over the network for purposes of activation. A call center activation. A call center employee then activates the device by sending provisioning parameters over the network to activate the wireless device. Alternatively, programming of the device is accomplished when a user calls an IVR system that asks the user to enter subscription information. The device is programmed to allow for services as indicated by the user. The interaction between the network and the device is by means of a series of inputs provided by the user. Both methods are costly and time consuming as the process of activation is sequential and sooner or later requires human intervention at the customer-care center.

Systems that allow the over-the-air (OTA) activation of unregistered devices use specially designated numbers to allow unregistered devices to contact the network and register through an automated system, or to allow a user contact a wireless customer care center for purposes of activation. The system then activates the device by sending provisioning parameters over the network to activate the wireless device. Alternatively, programming provisioning parameters into the device is done by calling IVR systems that asks the user to enter the subscriber information. Based on the input, the device is further programmed to allow for services signed up by the user. The interaction between the network and the device is by means of a series of inputs provided by the user. This is a costly and time consuming process as the process of activation is sequential and requires human intervention at the customer-care center.

Further, requiring subscribers to enter information through the wireless device is often error prone resulting in costly customer care calls to rectify the previously provisioned information.

To avoid, interactive user input, some systems allow the user to enter the subscription information through web interface that provides the user with a form. The web-based form has the required fields that need to be filled in by the user. However, this technique requires the user to have web access as well as the ability to read the credentials that are associated with the device and enter all this information.

Thus, there is need to support self-care as opposed to the prior art of customer-care operations for provisioning and activating wireless devices in a network. Subscriber self-activation method is a means to support self-care by which a device is allowed to access the network for the purpose of obtaining permanent credentials by establishing a session with a management server. The management server then programs the device with the appropriate parameters commensurate with the subscribed services.

SUMMARY OF THE INVENTION

There is need to support self-care as opposed to the prior art of customer-care operations for provisioning and activating wireless devices in a network. Subscriber self-activation method is a means to support self-care by which a device is allowed to access the network for the purpose of obtaining permanent credentials by establishing a session with a management server. The management server then programs the device with the appropriate parameters commensurate with the subscribed services.

The present invention relates to a system and method to enable subscriber self-activation and configuration of wireless data terminals by means of an activate button provided through the User Interface (UI). This allows for operations to be performed on the device by self-care. Any wireless device, in order to access the network needs credentials. To get the credentials, it needs to access the network. This invention provides a solution to the circular problem by generating temporary credentials to present to the network for service activation. Once access is granted to the network, the device can be activated and configured for using the resources of the network.

A system and method to allow new, deactivated or unprovisioned wireless devices access to wireless networks so that they can connect to a management server to obtain the necessary credentials to access the services offered by the network.

First, the invention is a method by which temporary credentials are generated by the device using any of the permanent identifiers associated with the device. The temporary credentials are presented to the network that allows access to the device to connect to a management server. The process of generating the credentials can be initiated by the push of a button (software or hardware) or by the insertion of a subscription card.

Next, the invention is a method by which the network is programmed to allow access to devices with temporary credentials. The range of allowed temporary identities are predetermined and installed in the network. Any device with a temporary credential that falls within this range will be allowed access to a management server.

Next, the invention describes an algorithm to generate temporary credentials using various permanent identity associated with the device hardware.

Another embodiment of the invention is a mechanism by which a deactivated device regenerates the temporary credentials and erases the old permanent credentials. A device can be deactivated by the network for various reasons; e.g., not paying the required fee. At some later point in time the, owner may be back in good standing. However, the permanent identity of the device could be recycled and issued to some other device. In such case, it is imperative to regenerate temporary credentials and obtain new permanent credentials. The regenerated temporary credentials is then used to initiate a session with a management server and reactivate the device for services proscribed the current subscription.

FIG. 1 is an embodiment of a wireless network that consists of a radio access network consisting of base stations that can communicate with a wireless device and a backbone network connected to various servers. For those skilled in the art, the wireless technology can be any of the schemes available to communicate wirelessly with a device. Examples include CDMA, GPRS, WiFi, WiMax, UMTS etc. For a device to operate in this network it needs to have certain credentials, operational parameters and software. These can all be preprogrammed at the factory and stored in the device or sent over the air to the device from a management server. Typically, the connection is initiated after making a call to a customer care center and manually entering subscriber information. The present invention provides a mechanism for subscriber self-activation. Here, with the push of a button or insertion of a subscriber card, the software on the device makes a connection with a management server and downloads the necessary parameters and software over the air with no manual operations or human intervention.

For receiving the necessary operational parameters and software, the device needs to make a connection to a management server and hence posses proper credentials such as a phone number, IP address, client ID, password etc. A wireless data terminal or a wireless device has to be provided with credentials that can be checked by network elements in order to access the network. New wireless data terminals that are shipped to the users cannot beforehand know the credentials of the network in which it will operate. In order to get these credentials, the device needs to have these credentials beforehand. The present invention provides a method to generate temporary credentials that allow the device to make a connection with the management server. The management server then provides the device with the required operational parameters and permanent credentials that match the subscribed services.

In this invention, a mechanism that generates temporary credentials to access the network which after verification of device and user identity can be converted into permanent credentials is detailed. One aspect of the invention is an algorithm to generate temporary credentials based on device identities such as ESN, MAC address, IMEI, MEID, ICCID etc. These are identities are permanently associated with a device and can be used to generate temporary network credentials such as telephone number, IP address (IPv4 or IPv6), link local address to access the network. Devices accessing the network with temporary credentials will be allowed access to a management server which after verification of the device signature will assign permanent credentials and configuration parameters. Thus, new devices will be activated and configured to use the chosen network. FIG. 3 shows the flow diagram of the process used by the network to allow devices with temporary credentials to access the management server. The range of temporary credentials delimited by lower bound (LB) and upper bound (UB) are beforehand agreed upon by network operators. The algorithm used by the software on the device generates a temporary identity that falls within this range.

A software on the mobile device when activated by a button or the insertion of a card, will read any or combination of device identities such as ESN, MAC address etc. These are identities associated with the hardware device. The temporary credentials is then a hash of this identity. The range of the hash can be agreed upon beforehand between the device manufacturers and the network providers. For example, to calculate a temporary IP address for the device, a hash of the ESN can be added to the starting address of the temporary IP address range. Other hash functions may be generated and agreed upon by device manufacturers and network providers for purposes of generating and determining valid credentials, including but not limited to hash functions that have longer results, or hash functions that include letters or other symbols. Similarly, a hash function applied to other hardware identities such as MAC address or IMEI can be used to generate any credentials, and any hardware identity can be used to generate other temporary credentials such as phone number or password. The device can then present these generated temporary credentials to gain access to a management server. The management server stores the device hardware identity and the required parameters. The subsequent session with the server downloads the permanent credentials which are then stored in the device. FIG. 2 shows the steps involved in this procedure.

Another aspect of the invention is to distinguish between a new device from the factory that needs first-time activation and a device which has been deactivated due to reasons of non-compliance. In such a case, the nature of the credentials stored in the device can be used to detect whether the device needs first time activation or reactivation. FIG. 4 shows the algorithm used by the software on the device to distinguish between a new device and a deactivated device. If the device has been activated before, it will have invalid or stale permanent credentials. If reactivation is desired and the management server can verify the compliance of the subscriber, a device activation code is sent that will be compared to a code that is generated locally. If successful, the device will generate temporary credentials and then initiate a session with the management server that will assign permanent credentials and configuration parameters. Thus, devices that have been deactivated will once again be securely activated and configured to use the network.

A method is described for generating temporary network credentials for a wireless device, the wireless device operable to send and receive data over a wireless network, the wireless network operable to transmit messages between the wireless device and a management server. The method includes reading a device identity of the wireless device, creating a temporary network credentials on the wireless device, establishing a data session between the wireless device and the management server, and storing permanent network credentials on the wireless device.

In another aspect of the invention, the step of creating temporary network credentials on the wireless device requires calculating the temporary network credentials as a function of the device identity.

In another aspect of the invention, there is an additional step of programming the network to allow connections by devices with valid temporary credentials.

In another aspect of the invention, there is an additional step of redirecting a connection from a wireless device with temporary credentials to a management server.

In another aspect of the invention, there is an additional step of sending permanent credentials from the management server to the wireless device which indicate a subscription level of the wireless device.

In another aspect of the invention, there is an additional step of accepting user input on the wireless device.

In another aspect of the invention the step of reading the device identity occurs after user input is accepted on the wireless device. In one aspect of the invention, the user input is a button on the wireless device. In another aspect of the invention, the user input is the insertion of a media card.

In another aspect of the invention, there is an additional step of determining whether a stored credentials on the wireless device is well formed.

In another aspect of the invention, there is an additional step of determining whether the device has previously been activated from the stored credentials. In one aspect of the invention, the temporary stored credentials are stored on the media card.

In another aspect of the invention, there is an additional step of storing a function capable of generating a range of valid temporary credentials on the network. In one aspect of the invention, the function capable of generating a range of valid temporary credentials is obtained from wireless devices that may be activated on the network.

A system is described for subscribing a wireless device on a network, including a processor operable to execute computer program instructions, an adapter operable for communicating with a network, an interface capable of accepting user input, and software operational on the wireless device. The system and software are operable to perform the steps of reading a device identity of the wireless device, creating a temporary network credentials on the wireless device, establishing a data session between the wireless device and the management server, and storing permanent network credentials on the wireless device.

In another aspect of the invention, the step of creating temporary network credentials on the wireless device requires calculating the temporary network credentials as a function of the device identity.

In another aspect of the invention, there is an additional step of programming the network to allow connections by devices with valid temporary credentials.

In another aspect of the invention, there is an additional step of sending permanent credentials from the management server to the wireless device which indicate a subscription level of the wireless device.

In another aspect of the invention, there is an additional step of accepting user input on the wireless device.

In another aspect of the invention, there is an additional step of determining whether a stored credentials on the wireless device is well formed.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
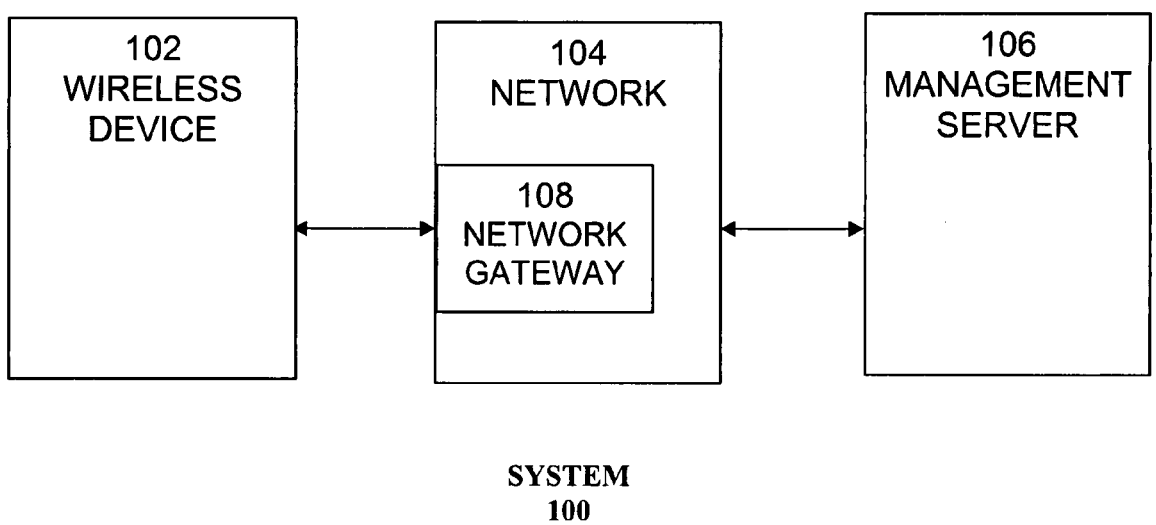
FIG. 1 is an exemplary block diagram of a network in which the present invention may be implemented.

An exemplary block diagram of a network system 100 in which the present invention may be implemented is shown in FIG. 1. Network 104 connects one or more wireless devices 102 to management server 106. Wireless device 102 may connect to network 104 wirelessly through a base station, or cell tower, or through another wireless device, or may connect through a wired connection, or through a combination wireline and wireless connection. Network 104 may include one or more wireless networks as well as one or more wireline networks, and may interconnect or interface with one or more networks. Network 104 may include private networks as well as public networks, and may use any networking technology, wireless link protocol or communication protocol, such as Transmission Control Protocol/Internet Protocol (TCP/IP), CDMA, GPRS, UMTS, HSPDA, EVDO, EVDV, WiFi, WiMAX, or Bluetooth.

Network gateway 108 is programmed to allow access to network 104 to devices 102 with the correct credentials. Network gateway 108 may be integrated into the hardware of network 104, or may be a separate system connected to network 104. Credentials may include one or more than one element, and may consist of, for example, a telephone number, network address, or link local address. The range of allowed credentials may change over time, and the determination of whether credentials are valid may be static or dynamic, for example, static credentials may be fixed, or dynamic credentials may be determined based upon a predetermined formula, as discussed below. Credentials may be permanent, or may be temporary. Network 104 may allow a device or devices 102 with credentials in a subset of a valid range access only to a subset of the network, for example to management server 106. Credentials may also be used to determine other aspects of a device's access to network 104 or systems connected to network 104, such as indicating subscription level. Examples of using credentials to indicate subscription level would include programming network gateway 108, or other systems connected to network 104, to allow credentials within different subsets of the valid range to access different areas of the network, or to be given a faster connection speed, or have access to specific systems connected to network 104.

Network gateway 108 may direct communications that are initiated by devices 102 that have temporary credentials for example, within a certain range, to a destination connected to gateway 104, for example, to management server 106, regardless of the destination specified by device 102. Any device 102 with a temporary credential that falls within this range will be allowed access to management server 106. Each set of temporary credentials must be used by only one device 102 at a time, however, different devices 102 may use the same temporary credentials at different times.

Wireless device or devices 102 can be any device that supports wireless communication including mobile telephones, laptop computers, personal digital assistants (PDAs), or network-capable-televisions. Device 102 may have a media reader to allow it to accept data input from computer readable media. Examples of such computer readable media include, but are not limited to, SIM cards or chips, flash drives, and transmission-type media, such as Bluetooth. The device 102 could support a single wireless communication standard or support multiple wireless communication standards. A wireless device 102 supporting multiple standards may communicate on any of the standards either separately or simultaneously. The communication could occur over licensed spectrum or unlicensed spectrum.

Management server 106 may be connected to network 104 directly, or may be connected through any public or private network, or a combination of public or private networks, to network 104.

A wireless device 102 will have a user interface. Typically, the user interface will have a graphical user interface, but may accept input from number or touch-tone keys, emit tones or words, or accept voice commands. Wireless device 102 may be capable of accepting data input through network 104 from any system connected to network 104, including programming input, audio, or video. The user interface on wireless device 102 will have an input in its graphical user interface that will initiate activation and/or configuration of wireless device 102. For example, as described below, this input may be an activation button, but other examples of inputs that may be used to initiate activation and/or configuration include a menu choice, voice command, key combination, insertion of a subscription card into a media reader of the device 102, or any other input that a device 102 can accept.

Wireless device 102 will also have one or more permanent identifiers associated with it. A permanent identifier, which may be referred to as a device identity, can be a unique immutable string that is associated with the device 102 hardware. This may be assigned to a device 102 by the manufacturer and contains information about the device 102. Examples of such a permanent identifier or device identity include, but are not limited to, device serial number, Electronic Serial Number (ESN), Mobile Equipment Identifier (MEID), International Mobile Equipment Identity (IMEI), Media Access Control (MAC), Integrated Circuit card ID (ICCID), or Stock Keeping Unit (SKU). This device identity generally is associated with a hardware component of the device 102 and uniquely identifies the device 102.

Figure 2:
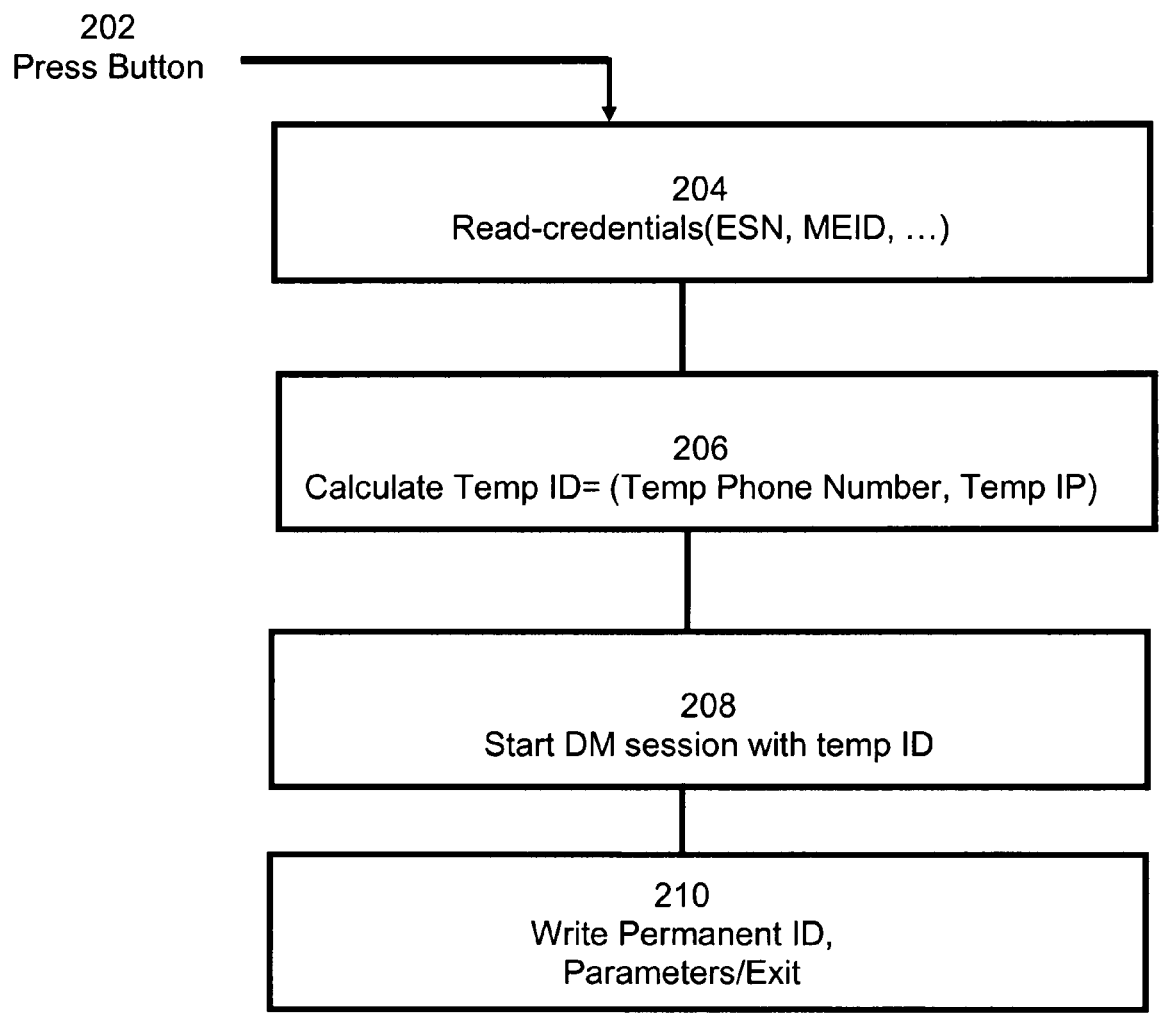
FIG. 2 is an exemplary flow diagram of a process for generating a temporary network identity for the network shown in FIG. 1.

A process 200 for initiating and completing activation and configuration of a wireless device 102, according to the present invention, is shown in FIG. 2. It is best viewed in conjunction with FIGS. 3 and FIG. 4, which are data flow diagrams for the process of determining the validity of credentials on the network and generating new credentials on the device. Process 200 begins with step 202, in which an input on device 102, such as a button, is pushed by a user. As described above, the input that initiates step 202 may be any input which device 102 is capable of and programmed to accept, such as the insertion of a properly configured media card. In step 204, device 102 reads a permanent identifier of the device and in step 206 generates temporary credentials based on the permanent identifier and a function programmed into the device 102. The function used to generate the credentials from a device identity may be any calculation that will generate valid credentials in the range available on network 104, for example, a hash function. Hash functions may be generated and agreed upon by device manufacturers and network providers for purposes of generating and determining valid credentials. Hash functions or other functions may be used to generate any needed credentials including but not limited to functions that have longer results, or functions that generate credentials which include letters or other symbols. The range of the function can be agreed upon beforehand between the device manufacturers and the network providers. For example, to calculate a temporary IP address for the device, a hash of the ESN can be added to the starting address of the temporary IP address range. Similarly, a function applied to other hardware identities such as MAC address or IMEI can be used to generate any credentials, and any hardware identity can be used to generate other temporary credentials. The credentials may include any information needed to access network 104 such as, for example, an origin address, a temporary phone number, temporary identification number, or temporary IP address.

Figure 3:
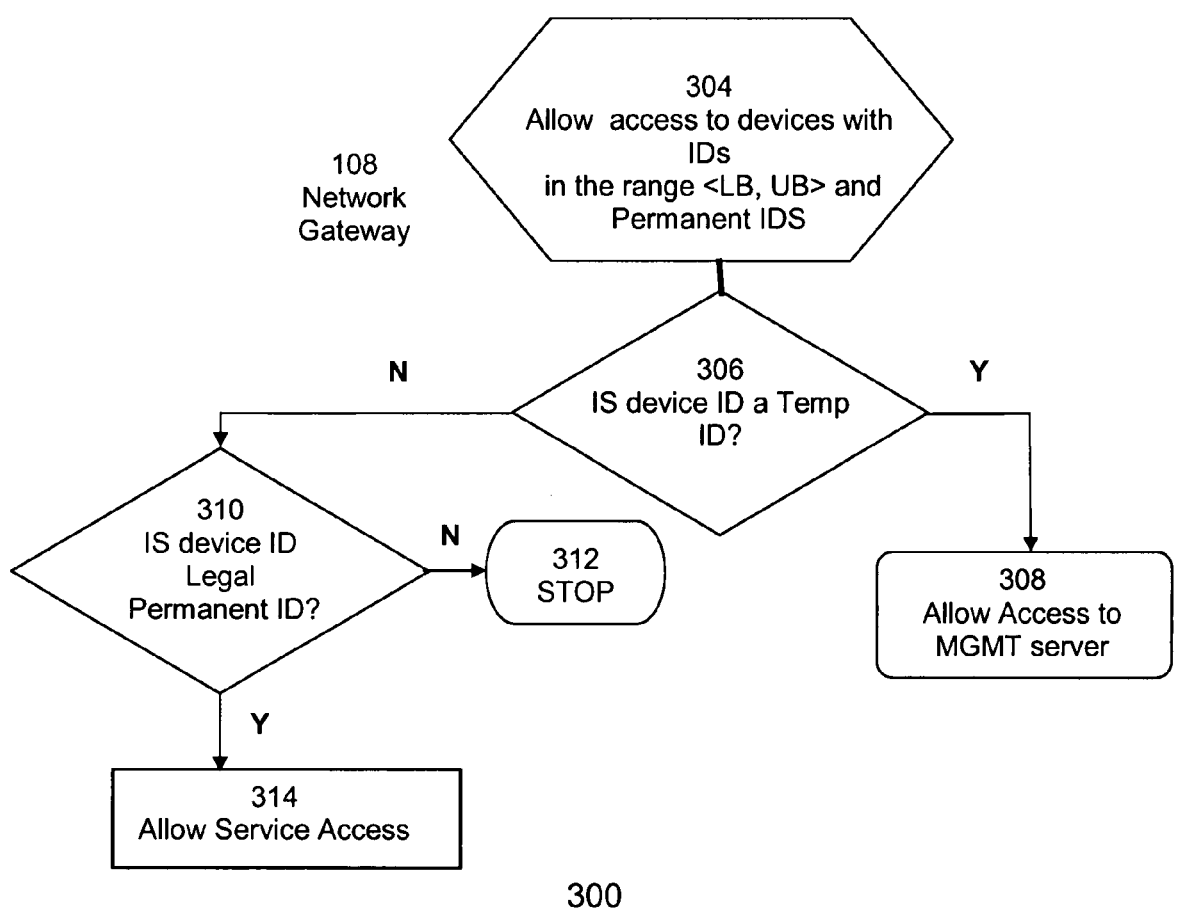
FIG. 3 is an exemplary flow diagram of a process for determining access to the network or to the management server shown in FIG. 1.
Figure 4:
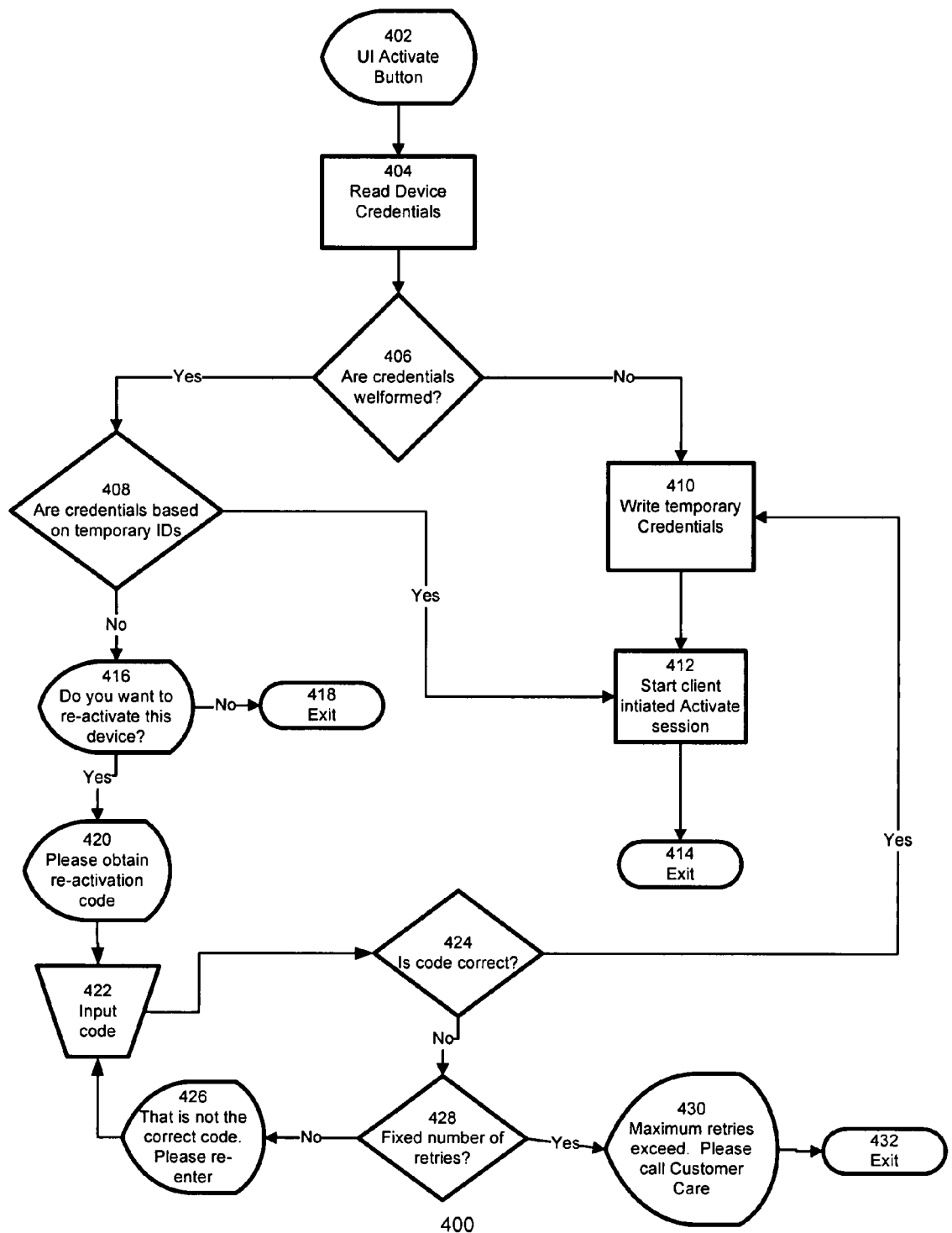
FIG. 4 is an exemplary flow diagram of a process for generating temporary credentials.

In step 208, device 102 contacts management server 106 through network 104. An example of the management session and communications between device 102, network 104 and management server 106 between step 208 and step 210 are shown in FIGS. 3 and 4, as described below. If the management session completes successfully, in step 210 permanent credentials, identification, and/or parameters will be recorded on device 102; if the management session does not complete with the writing of credentials or software, the process may exit, or may transfer to a different process such as error handling or notification to the network. Additional data and or software may also be recorded on device 102 during step 210.

An example of the process 300 by which a network gateway 108 determines whether a device 102 may access the network 104 or resources connected to the network 104, such as management server 106, is shown in FIG. 3. As demonstrated in step 304, network gateway 108 is programmed to allow access to network 104 to devices 102 with temporary credentials within a valid range, and to devices 102 with valid permanent credentials. In step 306, if the network determines that a device 102 has temporary credentials, the device 102 is allowed access to management server 106 in step 308. If device 102 does not have temporary credentials, in step 310 the network gateway 108 determines if device 102 has valid permanent credentials. If the credentials are valid, in step 314 the device 102 is allowed access to network 104, and if not, the device is denied access in step 312.

An example of the process 400 by which a wireless device 102 may be activated or re-activated, or subscribed or re-subscribed to network 104, is shown in FIG. 4. Process 400 begins with step 402, in which an input on device 102, such as a button, is pushed by a user. As described above, the input that initiates step 402 may be any input which device 102 is capable of and programmed to accept, such as the insertion of a properly configured media card, such as a subscription card. In step 404, the device 102 will read any or all of the device credentials. In step 406, the device 102 will determine whether the device 102 had previously been subscribed to the network 104.

If the device 102 had never been subscribed to network 104, the credentials will be blank or not properly formed, and in step 410 the device 102 will write temporary credentials using a function as described in step 206 above. Once the device 102 has generated temporary credentials, in step 412 the device will contact the management server as described in step 208 above. The management server may send permanent credentials, parameters or software. In step 414, the device may be disconnected from the network, or may be directed to a different system, process, or program for further processing or connection.

If the device 102 had previously been subscribed to network 104, there will be credentials on the device. If the credentials are well formed, in step 408 the device 102 will determine if the device has stale credentials, or valid temporary credentials—for example, the device might have valid temporary credentials if the activation process was not successfully completed in a previous attempt. If the credentials are valid temporary credentials, the device will proceed to step 412.

If the device has stale credentials, or credentials that are not otherwise valid temporary credentials, in 416 the user interface will query if the user wishes to activate the device. The user interface may query the user by any means possible to the device, for example by displaying a menu option, emitting an audio query, or connecting to an IVR that accepts touch-tone response. If the user indicates that they do not wish to re-activate the device, in step 418 the process ends. If the user indicates that they do wish to re-activate the device, the device may require an activation code, or other proof of payment, an example of which is described in steps 420-432 below. However, a person skilled in the art will understand that any process may be used to provide proof of valid activation or proof of payment, including proof obtained after activation or step 414, or no proof at all.

In step 420, the user will be prompted to input an activation code. The activation code may be obtained from a scratch card, similar to a long-distance phone card, that can be purchased, for example, from a retail outlet such as a convenience store or a mobile phone vendor, may be input from digital media, such as a SIM card, subscription card or other media as described above, or may be obtained from a web site or automated telephone system. Once the user has input the code in step 422, the device 102 will determine if the code is valid in step 424. If the code or other proof of payment is valid, the device 102 will proceed to step 410. If the code or other proof of payment is not valid, in step 428 there may be a limited number of times that invalid codes may be entered before the device 102 indicates in step 430 that an error has occurred and exits the re-activation process in step 432. However, the number of retries allowed in step 428 may be set to any value, including infinite retries. If the maximum number of retries has not yet been met, the device 102, will return to step 422.

Figure 5:
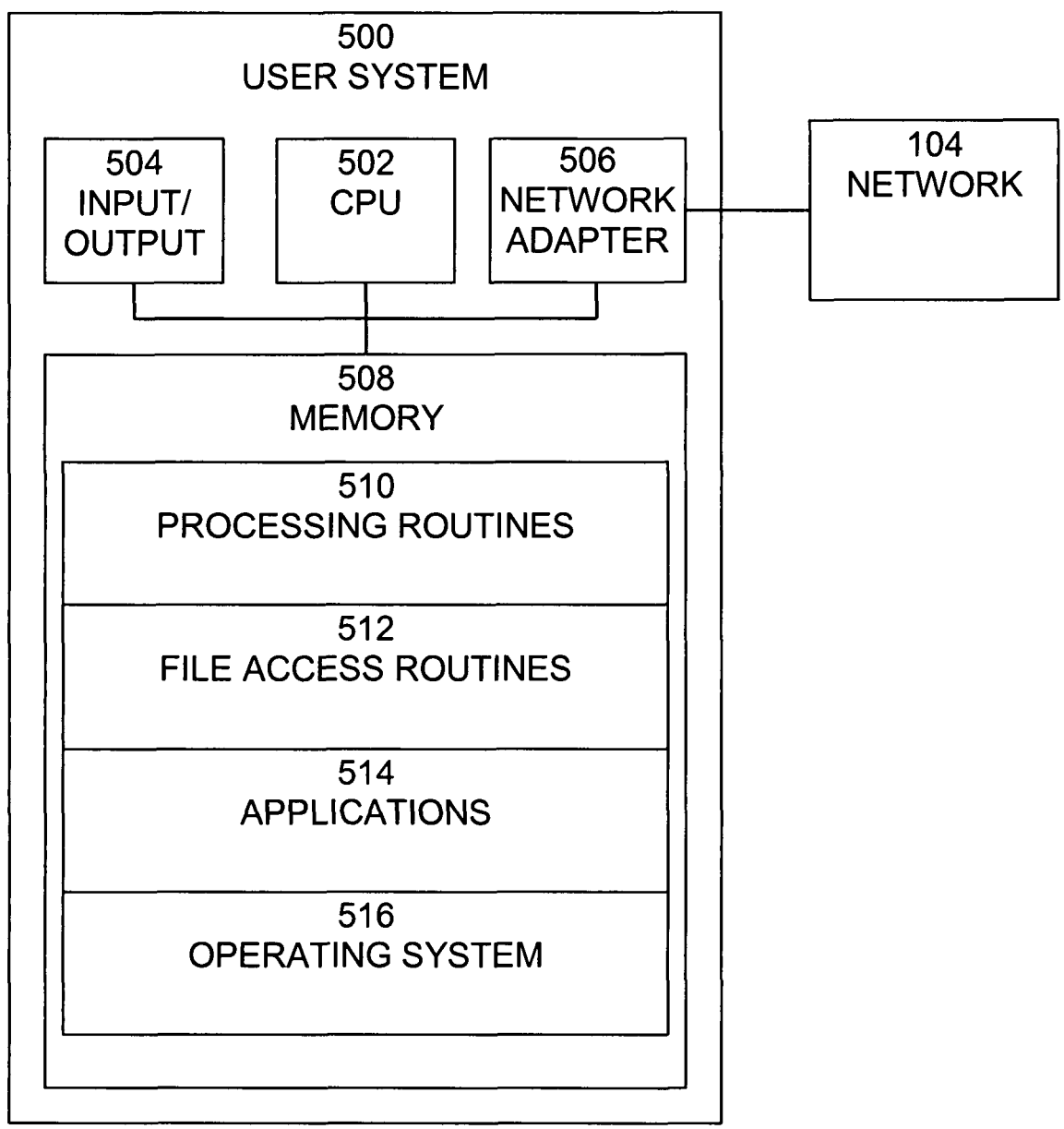
FIG. 5 is an exemplary block diagram of a system on which the present invention may be implemented.

A block diagram of an exemplary user system 500, in which the present invention may be implemented, is shown in FIG. 5. User system 500 is typically a programmed general-purpose computer system, such as a personal computer, workstation, server system, and minicomputer or mainframe computer. User system 500 includes processor (CPU) 502, input/output circuitry 504, network adapter 506, and memory 508. CPU 502 executes program instructions in order to carry out the functions of the present invention. Typically, CPU 502 is a microprocessor, such as an INTEL PENTIUM® processor, but may also be a minicomputer or mainframe computer processor. Although in the example shown in FIG. 5, user system 500 is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which user system 500 is implemented on a plurality of networked computer systems, which may be single-processor computer systems, multi-processor computer systems, or a mix thereof.

Input/output circuitry 504 provides the capability to input data to, or output data from, user system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces user system 500 with Internet/intranet 510. Internet/intranet 510 may include one or more standard local area network (LAN) or wide area network (WAN), such as Ethernet, Token Ring, the Internet, or a private or proprietary LAN/WAN.

Memory 508 stores program instructions that are executed by, and data that are used and processed by, CPU 502 to perform the functions of user system 500. Memory 508 typically includes electronic memory devices, such as random-access memory (RAM), which are capable of high-speed read and write operations providing direct access by the CPU 502. Additional memory devices included in user system 500 may include read-only memory (ROM), programmable read-only memory (PROM), electrically erasable programmable read-only memory (EEPROM), flash memory, electromechanical memory, magnetic disk drives, hard disk drives, floppy disk drives, tape drives, optical disk drives, etc.

Memory 508 includes processing routines 510, file access routines 512, applications 514, and operating system 516. File access routines 514 include software that provides access to files stored on local file storage and remote storage. Applications 514 include software used to perform other functions on user system 500. Operating system 516 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for generating temporary network credentials for a wireless device, the wireless device operable to send and receive data over a wireless network, the wireless network operable to transmit messages between the wireless device and a management server, the method comprising the steps of:
   reading at the wireless device a permanent identifier of the wireless device;
   creating temporary network credentials of the wireless device on the wireless device by the wireless device generating a new value based on the permanent identifier of the wireless device without sharing information with an external entity;
   establishing a data session between the wireless device and the management server using the temporary network credentials; and
   storing permanent network credentials on the wireless device.

2. The method of claim 1, where the step of creating temporary network credentials on the wireless device comprises:
   calculating the temporary network credentials as a function of the permanent identifier of the wireless device.

3. The method of claim 2, wherein the function is a hash function.

4. The method of claim 1, further comprising the step of:
   programming the network to allow connections by devices with valid temporary credentials.

5. The method of claim 4, further comprising the step of:
   redirecting a connection from a wireless device with temporary credentials to a management server.

6. The method of claim 1, further comprising the step of:
   sending permanent credentials from the management server to the wireless device which indicate a subscription level of the wireless device.

7. The method of claim 1, further comprising the step of:
accepting user input on the wireless device.

8. The method of claim 7, where the step of reading the permanent identifier of the wireless device occurs after user input is accepted on the wireless device.

9. The method of claim 7, where the user input is a button on the wireless device.

10. The method of claim 7, where the user input is the insertion of a media card.

11. The method of claim 10, where the temporary stored credentials are stored on the media card.

12. The method of claim 1, further comprising the step of:
determining whether a stored credentials on the wireless device is well formed.

13. The method of claim 12, further comprising the step of:
determining whether the device has previously been activated from the stored credentials.

14. The method of claim 1, further comprising the step of:
storing a function capable of generating a range of valid temporary credentials on the network.

15. The method of claim 1, where a function capable of generating a range of valid temporary credentials is obtained from wireless devices that may be activated on the network.

16. The method of claim 1, further comprising the step of:
regenerating the temporary network credentials.

17. The method of claim 1, further comprising the steps of:
accepting user input on the wireless device;
regenerating the temporary network credentials;
establishing a data session between the wireless device and the management server using the regenerated temporary network credentials; and
storing new permanent network credentials on the wireless device.

18. A system for subscribing a wireless device on a network comprising a processor operable to execute computer program instructions, an adapter operable for communicating with a network, an interface capable of accepting user input, software operational on the wireless device for performing the steps of:
reading a permanent identifier of the wireless device;
creating temporary network credentials of the wireless device on the wireless device by the wireless device generating a new value based on the permanent identifier of the wireless device without sharing information with an external entity;
establishing a data session between the wireless device and the management server using the temporary network credentials; and
storing permanent network credentials on the wireless device.

19. The system of claim 18, where the step of creating temporary network credentials on the wireless device comprises:
calculating the temporary network credentials as a function of the permanent identifier of the wireless device.

20. The system of claim 18, further comprising the step of:
programming the network to allow connections by devices with valid temporary credentials.

21. The system of claim 18, further comprising the step of:
sending permanent credentials from the management server to the wireless device which indicate a subscription level of the wireless device.

22. The system of claim 18, further comprising the step of:
accepting user input on the wireless device.

23. The system of claim 18, further comprising the step of:
determining whether a stored credentials on the wireless device is well formed.

\* \* \* \* \*